(12) United States Patent
Harada

(10) Patent No.: US 7,016,879 B2
(45) Date of Patent: Mar. 21, 2006

(54) SETTLEMENT METHOD IN DEAL OF GOODS OR SERVICE

(75) Inventor: Izumi Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 387 days.

(21) Appl. No.: 09/850,134

(22) Filed: May 8, 2001

(65) Prior Publication Data

US 2001/0044784 A1    Nov. 22, 2001

(30) Foreign Application Priority Data

May 9, 2000    (JP) ............................. 2000-136217

(51) Int. Cl.
G06F 17/60    (2006.01)
(52) U.S. Cl. ............................. 705/80; 705/64; 705/67
(58) Field of Classification Search ................. 705/80, 705/35, 36, 64, 67; 340/7.23, 313
See application file for complete search history.

(56) References Cited

U.S. PATENT DOCUMENTS 5,822,432 A * 10/1998 Moskowitz et al. .......... 380/28
6,442,532 B1 * 8/2002 Kawan ......................... 705/35
6,735,575 B1 * 5/2004 Kara ............................ 705/50

FOREIGN PATENT DOCUMENTS

| JP | 9-116960 | | 5/1997 |
| JP | 11-66430 | | 3/1999 |
| JP | 2001-306517 | | 11/2001 |
| JP | 02003067589 A | * | 3/2003 |
| WO | WO 96/13814 | | 5/1996 |
| WO | WO 98/47116 | | 10/1998 |

OTHER PUBLICATIONS

IBM Technical Disclosure Bulletin, TDB-ACC-NO: NNRD454118, Title: Method for individual authentication and settlement by using member card and cellular phone, Feb. 1, 2002.*

* cited by examiner

Primary Examiner—Elisca Pierre Eddy
(74) Attorney, Agent, or Firm—Foley & Lardner LLP

(57) ABSTRACT

When seller identification information and deal information presented by a seller are read in by a sensor, and authentication information is read in by an authentication information read-in device, a mobile terminal transmits the information and the purchaser information to a settlement computer. The settlement computer authenticates by the purchaser information and the authentication information, and if succeeding in authenticating, the settlement computer carries out the settlement, and transmits a settlement completion notice to the mobile terminal and the seller's apparatus.

44 Claims, 6 Drawing Sheets

SETTLEMENT METHOD IN DEAL OF GOODS OR SERVICE

BACKGROUND OF THE INVENTION

The present invention relates to a settlement method in a deal of a goods or a service by use of electronic apparatus, and in particular to the settlement method in a deal of a goods or a service by use of a mobile terminal and a settlement computer.

Conventionally, in a sale of commodities or services, a settlement has been carried out in cash, credit card, or the like.

When the settlement is carried out in cash, however, a purchaser has to carry about with cash, and there was a fear that the purchaser may lose the cash, or may be used by another person. In the same manner as in a credit card, when the purchaser loses the credit card, insofar as the purchaser does not submit a report of the loss, there was a fear that the credit card may be used by another person.

Furthermore, when the credit card is used, there was a fear that information of the credit card may be stolen by a seller and used evilly.

Furthermore, when a settlement is carried out in cash or credit card, for the purchaser's confirming and totalizing the own purchase record, the purchaser has to keep the account of the own purchase record by the purchaser, or procure the purchase record from a credit card company.

Furthermore, when the settlement is carried out in cash or credit card, a person who carries out the settlement has to be posted in an actual business site.

Furthermore, for settling in cash or credit card in a supermarket, etc., a clerk has to totalize the sum of purchased products at a cash register, and the purchaser has to await in a line at the cash register.

SUMMARY OF THE INVENTION

Accordingly, the objective of the present invention is to solve the above-mentioned tasks.

Moreover, the objective of the present invention is to provide a settlement method in a deal of a goods or a service in which, even if the purchaser does not carry cash or credit card, if the purchaser carries a mobile telephone, it becomes possible to settle the purchase of commodities or services in various deal situation, and the aforesaid problems in the settlement in cash, credit card, or the like do not generate.

The settlement method in a deal of a goods or a service according to the present invention comprises the steps of: storing purchaser identification information for identifying a purchaser by a mobile terminal; preparing deal information in the deal of the goods or the service in which a seller sells and the purchaser purchases, and seller identification information for identifying the seller; reading in the deal information and the seller identification information by the mobile terminal; reading in authentication information of the purchaser by the mobile terminal; transmitting the seller identification information, the purchaser identification information, the deal information and authentication information to a settlement computer by the mobile terminal; authenticating the purchaser based on the purchaser identification information and the authentication information by the settlement computer; and when succeeding in authenticating the purchaser, settling by the settlement computer's utilizing the seller identification information, the purchaser identification information and the deal information.

Furthermore, in the settlement method in a deal of a goods or a service according to the present invention, the settlement method in a deal of a goods or a service as above, prior to the step of transmitting the seller identification information, the purchaser identification information, the deal information and the authentication information to the settlement computer by the mobile terminal, further comprises the steps of: displaying the deal information by the mobile terminal; and inputting a transmission enable or disable signal by the mobile terminal, wherein only when the transmission enable or disable signal is positive, the mobile terminal transmits the seller identification information, the purchaser identification information, the deal information and the authentication information to the settlement computer.

Furthermore, in the settlement method in a deal of a goods or a service according to the present invention, in the settlement method in a deal of a goods or a service as above, at the step of displaying the deal information by the mobile terminal, the mobile terminal displays also the seller identification information.

Furthermore, in the settlement method in a deal of a goods or a service according to the present invention, the settlement method in a deal of a goods or a service as above further comprises the steps of: in advance storing the seller identification information and seller miscellaneous information so as to correspond to each other by the settlement computer; transmitting the read-in seller identification information to the settlement computer by the mobile terminal; and transmitting the seller miscellaneous information corresponding to the transmitted seller identification information to the mobile terminal by the settlement computer, wherein at the step of displaying the deal information by the mobile terminal, the mobile terminal displays also the seller miscellaneous information.

Furthermore, in the settlement method in a deal of a goods or a service according to the present invention, the settlement method in a deal of a goods or a service as above further comprises the steps of: at the step of preparing the deal information and the seller identification information, preparing seller miscellaneous information; at the step of reading in the deal information and the seller identification information by the mobile terminal, reading in also the seller miscellaneous information by the mobile terminal; and at the step of displaying the deal information by the mobile terminal, displaying also the seller miscellaneous information by the mobile terminal.

Furthermore, in the settlement method in a deal of a goods or a service according to the present invention, the settlement method in a deal of a goods or a service as above further comprises the step of storing the information displayed by the mobile terminal.

Furthermore, in the settlement method in a deal of a goods or a service according to the present invention, the settlement method in a deal of a goods or a service as above further comprises the steps of: at the step of preparing the deal information and the seller identification information, preparing basic information instead of the deal information; at the step of reading in the deal information and the seller identification information by the mobile terminal, reading in basic information instead of the deal information; and generating the deal information based on the basic information by the mobile terminal.

Furthermore, in the settlement method in a deal of a goods or a service according to the present invention, the settlement method in a deal of a goods or a service as above further comprises the steps of: at the step of preparing the deal information and the seller identification information, preparing basic information instead of the deal information; at the step of reading in the deal information and the seller identification information by the mobile terminal, reading in basic information instead of the deal information; transmitting the basic information to a deal information generator by the mobile terminal; and receiving the deal information generated based on the basic information by the deal information generator, by the mobile terminal.

Furthermore, in the settlement method in a deal of a goods or a service according to the present invention, the settlement method in a deal of a goods or a service as above further comprises the step of: after the settlement computer completes settling, transmitting settlement completion information to the seller's apparatus indicated by the seller identification information, by the settlement computer.

Furthermore, in the settlement method in a deal of a goods or a service according to the present invention, the settlement method in a deal of a goods or a service as above further comprises the step of: when the settlement computer transmits the settlement completion information to the apparatus, transmitting the deal information to the apparatus.

Furthermore, in the settlement method in a deal of a goods or a service according to the present invention, the settlement method in a deal of a goods or a service as above further comprises the step of: when the settlement computer transmits the settlement completion information to the apparatus, transmitting the purchaser identification information to the apparatus.

Furthermore, in the settlement method in a deal of a goods or a service according to the present invention, the settlement method in a deal of a goods or a service as above further comprises the steps of: in advance storing the purchaser identification information and the purchaser miscellaneous information so as to correspond to each other by the settlement information; and when the settlement computer transmits the settlement completion information to the apparatus, transmitting the purchaser miscellaneous information to the apparatus.

Furthermore, in the settlement method in a deal of a goods or a service according to the present invention, in the settlement method in a deal of a goods or a service as above, the apparatus makes a predetermined operation based on the received settlement completion information and deal information.

Furthermore, in the settlement method in a deal of a goods or a service according to the present invention, the settlement method in a deal of a goods or a service as above further comprises the step of: displaying or printing the received information by the apparatus.

Furthermore, in the settlement method in a deal of a goods or a service according to the present invention, the settlement method in a deal of a goods or a service as above further comprises the step of: storing the received information by the apparatus.

Furthermore, in the settlement method in a deal of a goods or a service according to the present invention, the settlement method in a deal of a goods or a service as above further comprises the step of: after the settlement computer completes settling, transmitting the settlement completion information to the mobile terminal by the settlement computer.

Furthermore, in the settlement method in a deal of a goods or a service according to the present invention, the settlement method in a deal of a goods or a service as above further comprises the step of: after the settlement computer transmits the settlement completion information to the mobile terminal, transmitting the deal information to the mobile terminal.

Furthermore, in the settlement method in a deal of a goods or a service according to the present invention, the settlement method in a deal of a goods or a service as above further comprises the step of: after the settlement computer transmits the settlement completion information to the mobile terminal, transmitting the seller identification information.

Furthermore, in the settlement method in a deal of a goods or a service according to the present invention, the settlement method in a deal of a goods or a service as above further comprises the steps of: in advance storing the seller identification information and the seller miscellaneous information so as to correspond to each other by the settlement computer; and when the settlement computer transmits the settlement completion information to the mobile terminal, transmitting the purchaser identification information, the deal information and the authentication information as well as the seller miscellaneous information corresponding to the transmitted seller identification information.

Furthermore, in the settlement method in a deal of a goods or a service according to the present invention, the settlement method in a deal of a goods or a service as above further comprises the steps of: at the step of preparing the deal information and the seller identification information, preparing seller miscellaneous information; at the step of reading in the deal information and the seller identification information by the mobile terminal, reading in also the seller miscellaneous information by the mobile terminal; at the step of transmitting the seller identification information, the purchaser identification information, the deal information, and the authentication information to the settlement computer by the mobile terminal, transmitting also the seller miscellaneous information by the mobile terminal; and when the settlement computer transmits the settlement completion information to the mobile terminal, transmitting also the seller miscellaneous information.

Furthermore, in the settlement method in a deal of a goods or a service according to the present invention, the settlement method in a deal of a goods or a service as above further comprises the step of: displaying the information received by the mobile terminal.

Furthermore, in the settlement method in a deal of a goods or a service according to the present invention, the settlement method in a deal of a goods or a service as above further comprises the step of: storing the information received by the mobile terminal.

Furthermore, in the settlement method in a deal of a goods or a service according to the present invention, in the settlement method in a deal of a goods or a service as above, the purchaser identification information includes a telephone number or an e-mail address.

Furthermore, in the settlement method in a deal of a goods or a service according to the present invention, in the settlement method in a deal of a goods or a service as above, the deal information indicates at least the sum of the goods or the service.

Furthermore, in the settlement method in a deal of a goods or a service according to the present invention, in the settlement method in a deal of a goods or a service as above, the deal information indicates also identification information of the deal.

Furthermore, in the settlement method in a deal of a goods or a service according to the present invention, in the settlement method in a deal of a goods or a service as above, the deal information indicates also a title of the goods or service.

Furthermore, in the settlement method in a deal of a goods or a service according to the present invention, in the settlement method in a deal of a goods or a service as above, the deal information indicates also identification information of the goods or service.

Furthermore, in the settlement method in a deal of a goods or a service according to the present invention, in the settlement method in a deal of a goods or a service as above, the deal information and the seller identification information are indicated by an optical form, an electric form, a magnetic form or a radiowave form.

Furthermore, in the settlement method in a deal of a goods or a service according to the present invention, in the settlement method in a deal of a goods or a service as above, the deal information and the seller identification information are indicated by a one-dimensional or two-dimensional bar code.

Furthermore, in the settlement method in a deal of a goods or a service according to the present invention, in the settlement method in a deal of a goods or a service as above, the seller miscellaneous information is indicated by an optical form, an electric form, a magnetic form or a radiowave form.

Furthermore, in the settlement method in a deal of a goods or a service according to the present invention, in the settlement method in a deal of a goods or a service as above, the seller miscellaneous information is indicated by a one-dimensional or two-dimensional bar code.

Furthermore, in the settlement method in a deal of a goods or a service according to the present invention, in the settlement method in a deal of a goods or a service as above, the authentication information is a password, a voice, fingerprint information, or eyeball information.

Furthermore, in the settlement method in a deal of a goods or a service according to the present invention, in the settlement method in a deal of a goods or a service as above, the purchaser miscellaneous information is at least one of a name, an address, a telephone number, an age and a sex distinction of the purchaser.

Furthermore, in the settlement method in a deal of a goods or a service according to the present invention, in the settlement method in a deal of a goods or a service as above, the seller miscellaneous information is at least one of a name, an address and a telephone number of the seller.

The mobile terminal according to the present invention comprises: means for storing the purchaser identification information for identifying the purchaser; means for reading in the deal information in the deal of the goods or service which the seller sells and the purchaser purchases, and the seller identification information for identifying the seller; means for reading in the authentication information of the purchaser; and means for transmitting the seller identification information, the purchaser identification information, the deal information and the authentication information to the settlement computer.

Furthermore, in the mobile terminal according to the present invention, the mobile terminal as above further comprises means for receiving the settlement completion information from the settlement computer.

The settlement computer according to the present invention comprises: means for receiving the seller identification information for identifying the seller, the purchaser identification information for identifying the purchaser, the deal information in the deal of the goods or service which the seller sells and the purchaser purchases, and the authentication information of the purchaser, from the mobile terminal; means for authenticating the purchaser by the purchaser identification information and the authentication information; and means for, when succeeding in authenticating the purchaser, settling by utilizing the seller identification information, the purchaser identification information and the deal information.

Furthermore, in the settlement computer according to the present invention, the settlement computer as above further comprises first transmission means for, after the settlement is completed, transmitting the settlement completion information to the seller's apparatus indicated by the seller information.

Furthermore, in the settlement computer according to the present invention, in the settlement computer as above, the first transmission means transmits the deal information also to the apparatus.

Furthermore, in the settlement computer according to the present invention, in the settlement computer as above, the first transmission means transmits the purchaser identification information also to the apparatus, Furthermore, in the settlement computer according to the present invention, the settlement computer as above further comprises means for in advance storing the purchaser identification information and the purchaser miscellaneous information so as to correspond to each other, wherein the first transmission means transmits the purchaser miscellaneous information also corresponding to the purchaser identification information to the apparatus.

Furthermore, in the settlement computer according to the present invention, the settlement computer as above further comprises second transmission means for, after the settlement is completed, transmitting the settlement completion information to the mobile terminal.

Furthermore, in the settlement computer according to the present invention, in the settlement computer as above, the second transmission means transmits the deal information also to the mobile terminal.

Furthermore, in the settlement computer according to the present invention, in the settlement computer as above, the second transmission means transmits the seller identification information also.

Furthermore, in the settlement computer according to the present invention, the settlement computer as above further comprises means for in advance storing the seller identification information and the seller miscellaneous information so as to correspond to each other, wherein the second transmission means transmits the seller miscellaneous information also corresponding to the seller identification information to the mobile terminal.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

An embodiment of the present invention will be explained in conjunction with the drawings.

Figure 1:
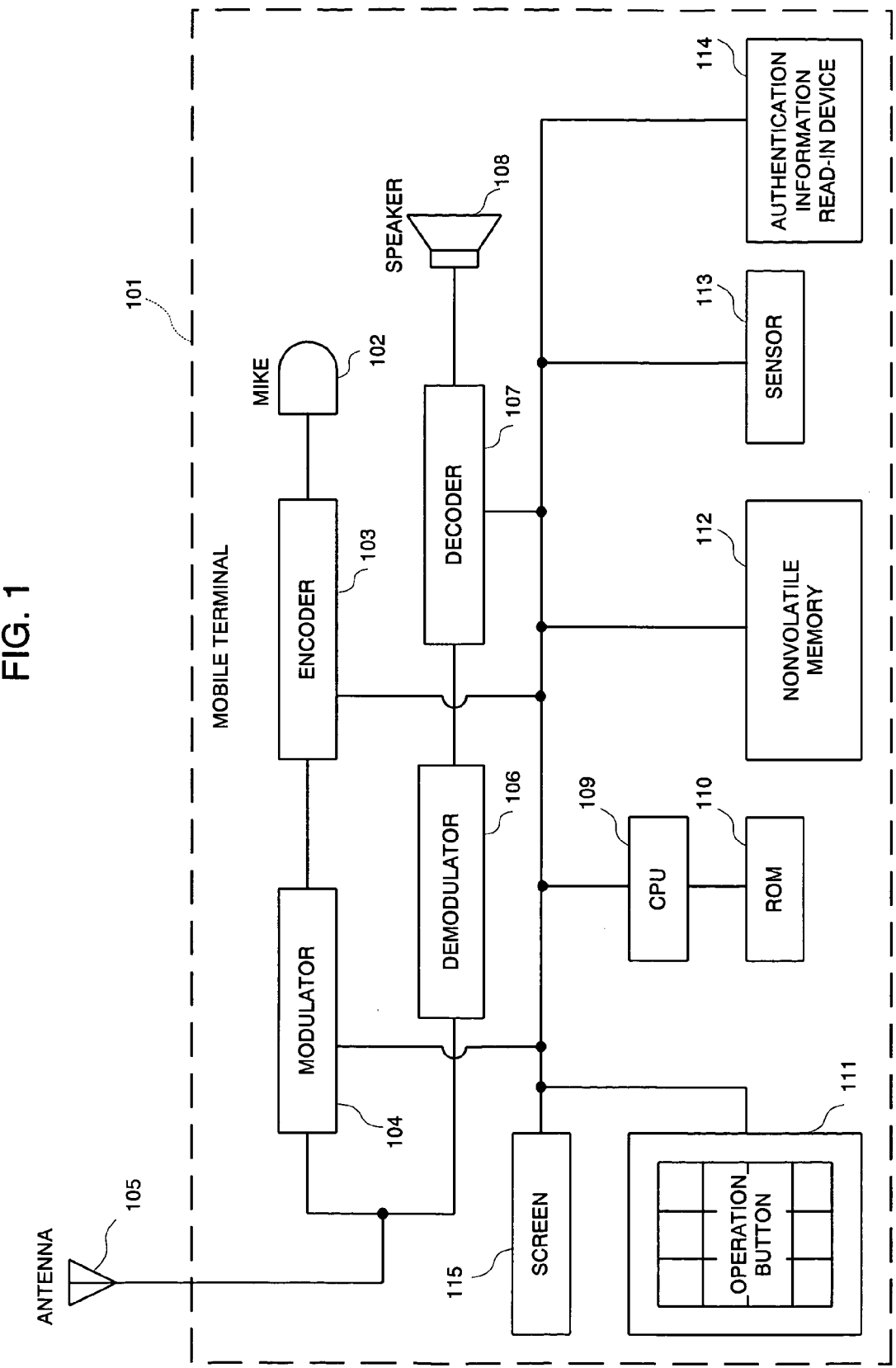
FIG. 1 is a block diagram showing a configuration of a mobile terminal according to an embodiment of the present invention.

Referring to FIG. 1, a mobile terminal 101 according to this embodiment is a PDC terminal, a PHS terminal, a CDMA mobile terminal, or the like. The mobile terminal comprises: a mike 102 for inputting a voice; an encoder 103 for encoding the input voice, or information input from a CPU 109, etc.; a modulator 104 for modulating the encoded voice or information; an antenna 105 for transmitting the modulated voice or information as a radiowave; a demodulator 106 for demodulating a radiowave received by the antenna 105; a decoder 107 for decoding a demodulation signal output from the demodulator 106 to a voice or information; and a speaker 108 for outputting the decoded voice. Furthermore, the mobile terminal 101 comprises the CPU 109 for controlling the entire operation of the mobile terminal 101 and a ROM 110 for recording a program of executing control operation in the CPU 109.

Furthermore, the mobile terminal 101 comprises an operation button 111 for inputting a calling telephone number, a telephone number of the mobile terminal 101 itself, a command, an e-mail address allocated for the mobile terminal 101, or the like; a nonvolatile memory 112 for storing the telephone number of the input mobile terminal 101 itself, the e-mail address allocated for the mobile terminal 101, or various pieces of information; a sensor 113 such as a bar code reader, an image sensor, an electronic information read-in device, a magnetic sensor, a receiver, or the like; an authentication information read-in device 114 such as a fingerprint read-in device, an image sensor, or the like; and a screen 115 for displaying the telephone number, or information represented by characters, digits, or the like. The authentication information read-in device 114 may be the operation button 111.

An owner of the mobile terminal is a person which becomes a purchaser at a later time. The above telephone number or e-mail address is purchaser identification information.

Figure 2:
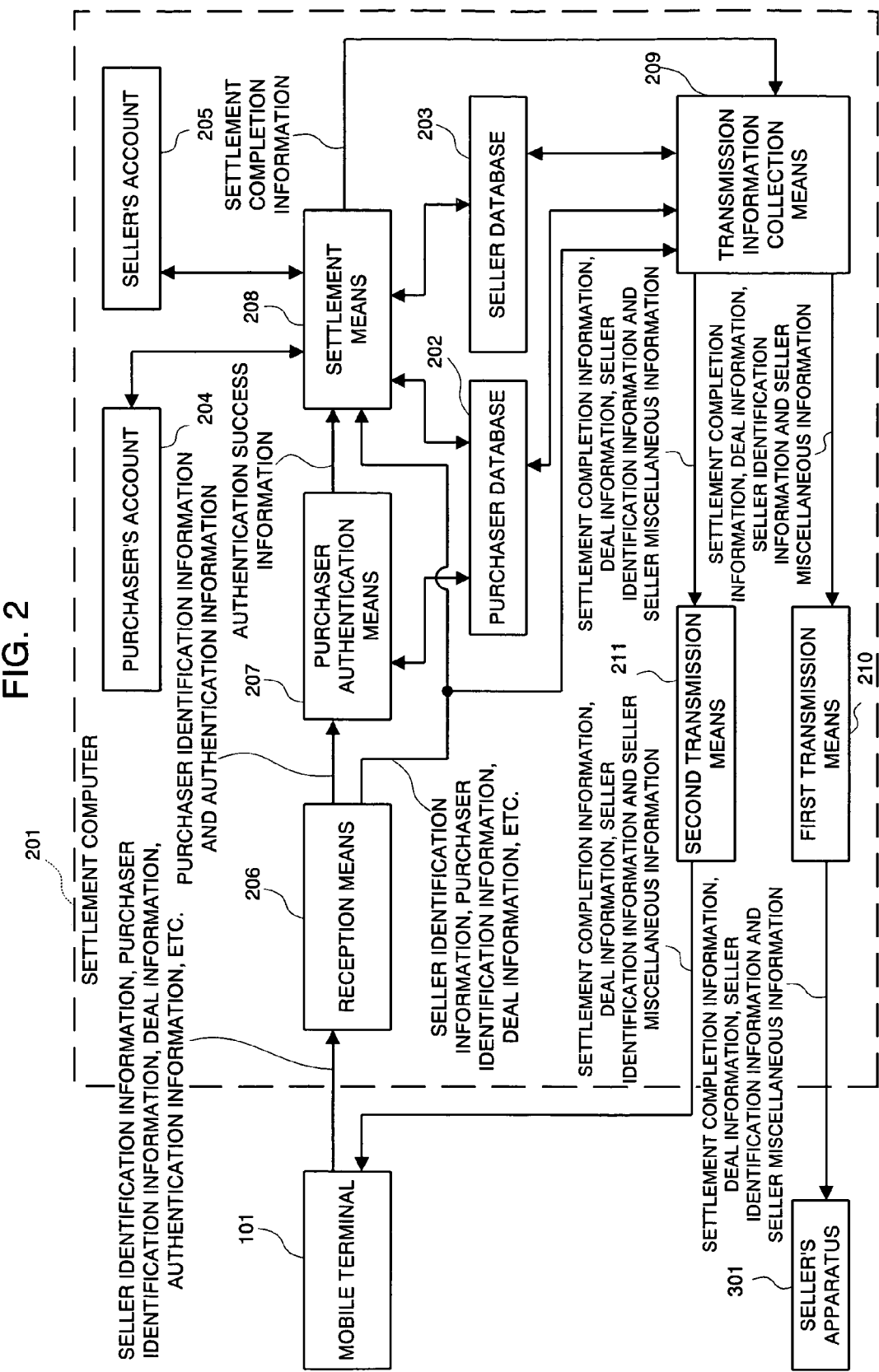
FIG. 2 is a block diagram showing a configuration of a settlement computer according to the embodiment of the present invention.

Referring to FIG. 2, a settlement computer 201 according to this embodiment comprises: reception means 206 for receiving a purchaser database 202 which records purchaser identification information, the purchaser's authentication information and purchaser miscellaneous information so as to correspond to each other, a seller database 203 which records seller identification information and seller miscellaneous information so as to correspond to each other, the purchaser's account 204, a seller's account 205, and the seller identification information, purchaser identification information, deal information, the authentication information and the like from the mobile terminal 101; purchaser authentication means 207 for authenticating the purchaser with reference to the purchaser database 202 based on the purchaser identification information and the authentication information input from the reception means 206, and if succeeding in authenticating, outputting authentication success information; settlement means 208 for, if inputting the authentication success information, settling by transferring between the purchaser's account 204 and the seller's account 205 with reference to the purchaser database 202 and the seller database 203 based on the seller identification information, the purchaser identification information, and the deal information, and if completing the settlement, outputting settlement completion information; transmission information collection means 209 for, if inputting the settlement completion information, inputting the seller identification information, the purchaser identification information and the deal information, obtaining the purchaser miscellaneous information with reference to the purchaser database 202 based on the purchaser identification information, obtaining the seller miscellaneous information with reference to the seller database 203 based on the seller identification information, outputting the settlement completion information, the deal information, the purchaser identification information and the purchaser miscellaneous information to first transmission means 210, and outputting the settlement completion information, the deal information, the seller identification information and the seller miscellaneous information to second transmission means 211; the first transmission means 210 for transmitting the settlement completion information, the deal information, the purchaser identification information and the purchaser miscellaneous information input from the transmission information collection means 209 to a seller's apparatus 301; and the second transmission means 211 for transmitting the settlement completion information, the deal information, the seller identification information and the seller miscellaneous information input from the transmission information collection means 209 to the mobile terminal 101.

Next, referring to FIGS. 1 to 7, an operation according to the embodiment of the present invention will be explained.

First, the mobile terminal 101 stores the purchaser identification information in the nonvolatile memory 112 (step 301). Next, the seller prepares the seller identification information and the deal information in the form that the mobile terminal 101 can read in them by the sensor 113 (step 302). Next, the mobile terminal 101 reads in the seller identification information and the deal information by the sensor 113 by the purchaser's operation (step 303). Next, the mobile terminal 101 reads in the purchaser's authentication information by the authentication information reader 114 by the purchaser's operation or spontaneous operation (step 304). Next, the mobile terminal 101 displays the seller identification information, the purchaser identification information and the deal information on the screen 115. Next, the mobile terminal 101 inputs a transmission enable or disable signal via the operation button 111 by the purchaser (step 305). Next, the mobile terminal 101 judges whether or not the transmission enable or disable signal is positive (step 307). If the result of the judgement is negative, the mobile terminal 101 arrests the settlement operation. If the result of judgement is positive, the mobile terminal transmits the seller identification information, the purchaser identification information, the deal information and the authentication information to the settlement computer 201 via the encoder 103, the demodulator 104 and the antenna 105 (step 308).

In the settlement computer 201, the reception means 206 receives the seller identification information, the purchaser identification information, the deal information and the authentication information transmitted, the purchaser authentication means 207 refers to the purchaser database 202 based on the purchaser identification information and the authentication information and authenticates the purchaser (step 309). When the purchaser authentication is failed, the settlement operation is ended. When ending, the settlement computer 201 may transmit the effect of authentication failure to the mobile terminal 101. When the purchaser authentication is succeeded, the settlement means 208 settles by utilizing the seller identification information, the purchaser identification information and the deal information (step 311). When settling, the purchaser's account 204 is transferred to the seller's account 205.

If the settlement is ended, the settlement computer transmits settlement completion information, the deal information, the purchaser identification information and the purchaser miscellaneous information from the first transmission means 210 to the seller's apparatus 301 designated by the seller identification information (step 312), and transmits the settlement completion information, the deal information, the seller identification information and the seller miscellaneous information to the mobile terminal 101 (step 316).

If the seller's apparatus 301 receives the deal information, the purchaser identification information and the purchaser miscellaneous information, the seller's apparatus 301 operates in correspondence with the settlement completion information and the deal information (step 313), and displays or prints the received information (step 314), and stores (step 315).

If the mobile terminal receives the settlement completion information, the deal information, the seller identification information and the seller miscellaneous information, the mobile terminal displays the received information on the screen 115 (step 317), and stores it in the nonvolatile memory 112 (step 318).

Figure 4:
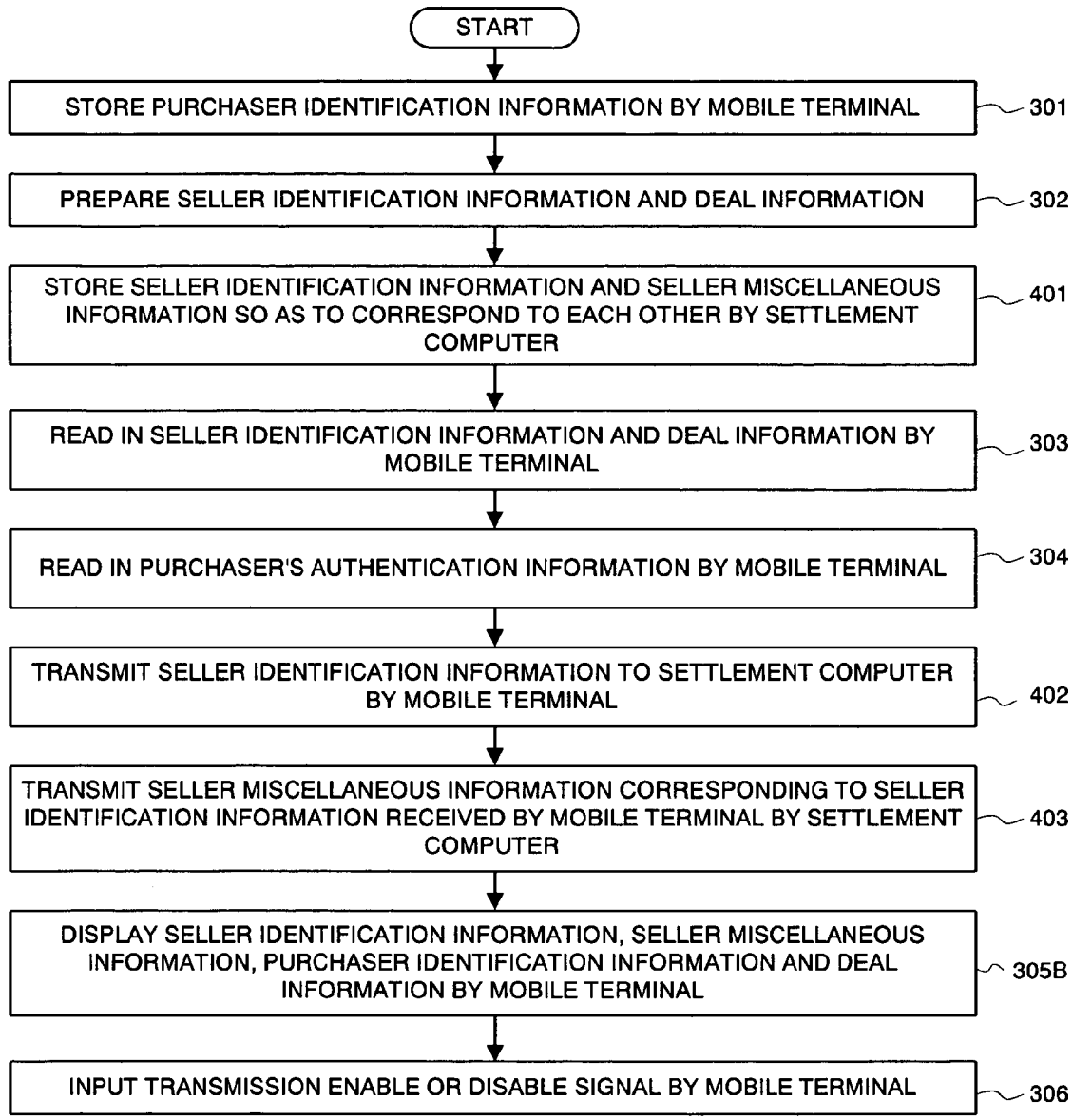
FIG. 4 is a second flowchart showing operation of the settlement method in a deal of a goods or a service according to the embodiment of the present invention.

Next, a first embodiment in which the mobile terminal 101 displays the seller miscellaneous information on the screen 115 prior to inputting the transmission enable or disable signal will be described with reference to FIG. 4.

The settlement computer 201 stores the seller identification information and the seller miscellaneous information so as to correspond to each other in the seller database 203 prior to the deal (step 401).

If the mobile terminal 101 reads in the purchaser's authentication information (step 304), the mobile terminal 101 transmits the seller identification information to the settlement computer 201 to inquire the seller miscellaneous information corresponding to the seller identification information (step 402). If the settlement authority 201 receives the inquiry, the settlement authority 201 retrieves the seller miscellaneous information corresponding to the seller identification information from the seller database 203, and transmits it to the mobile terminal 101 (step 403).

Figure 3:
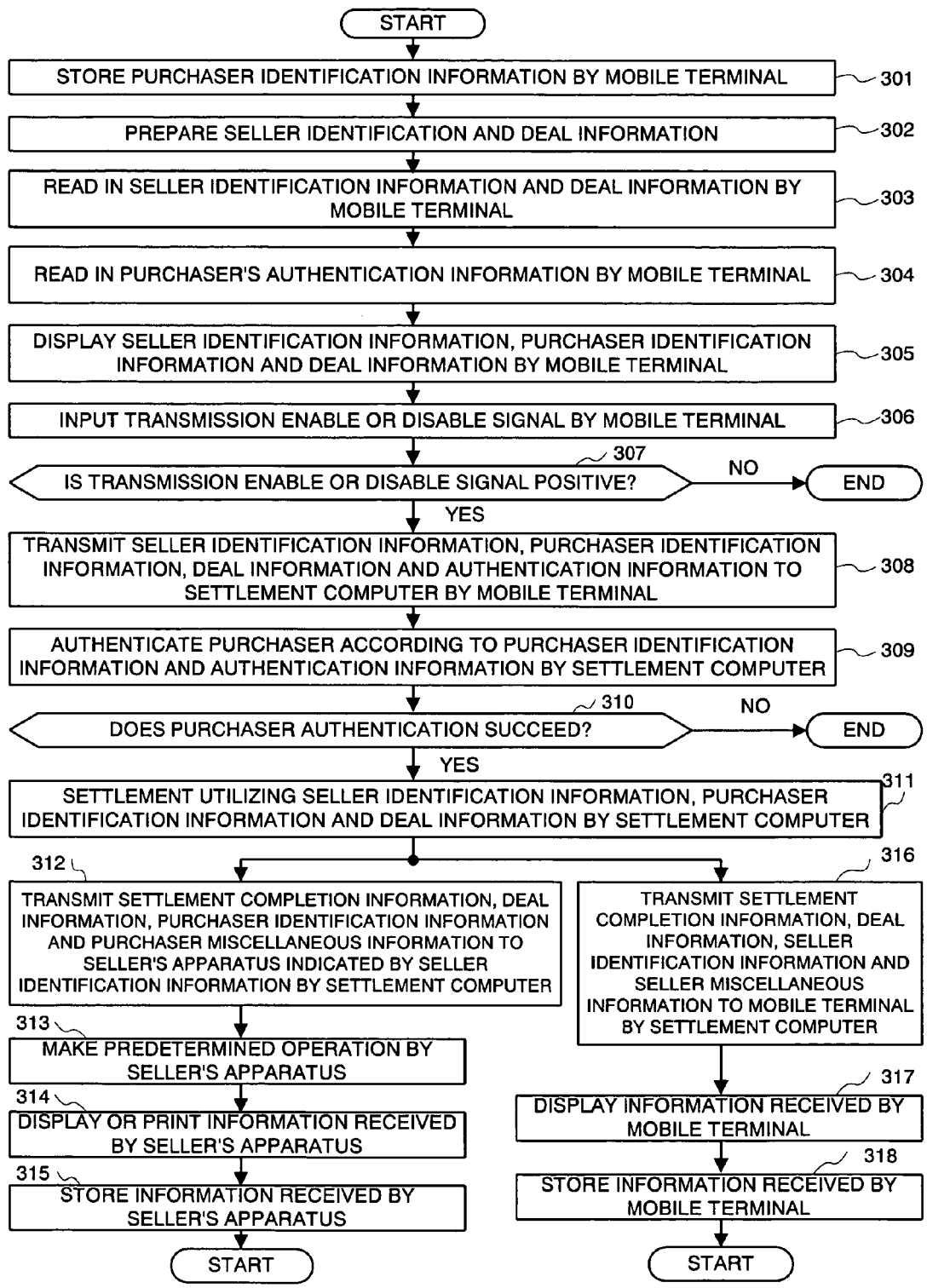
FIG. 3 is a first flowchart showing operation of a settlement method in a deal of a goods or a service according to the embodiment of the present invention.

If the mobile terminal 101 receives the seller miscellaneous information, the mobile terminal 101 displays not only the seller identification information, the purchaser identification information and the deal information (step 305), but also the seller miscellaneous information (step 305B). At step 305 and on, the same operation as the operations from step 306 of FIG. 3 is performed.

Figure 5:
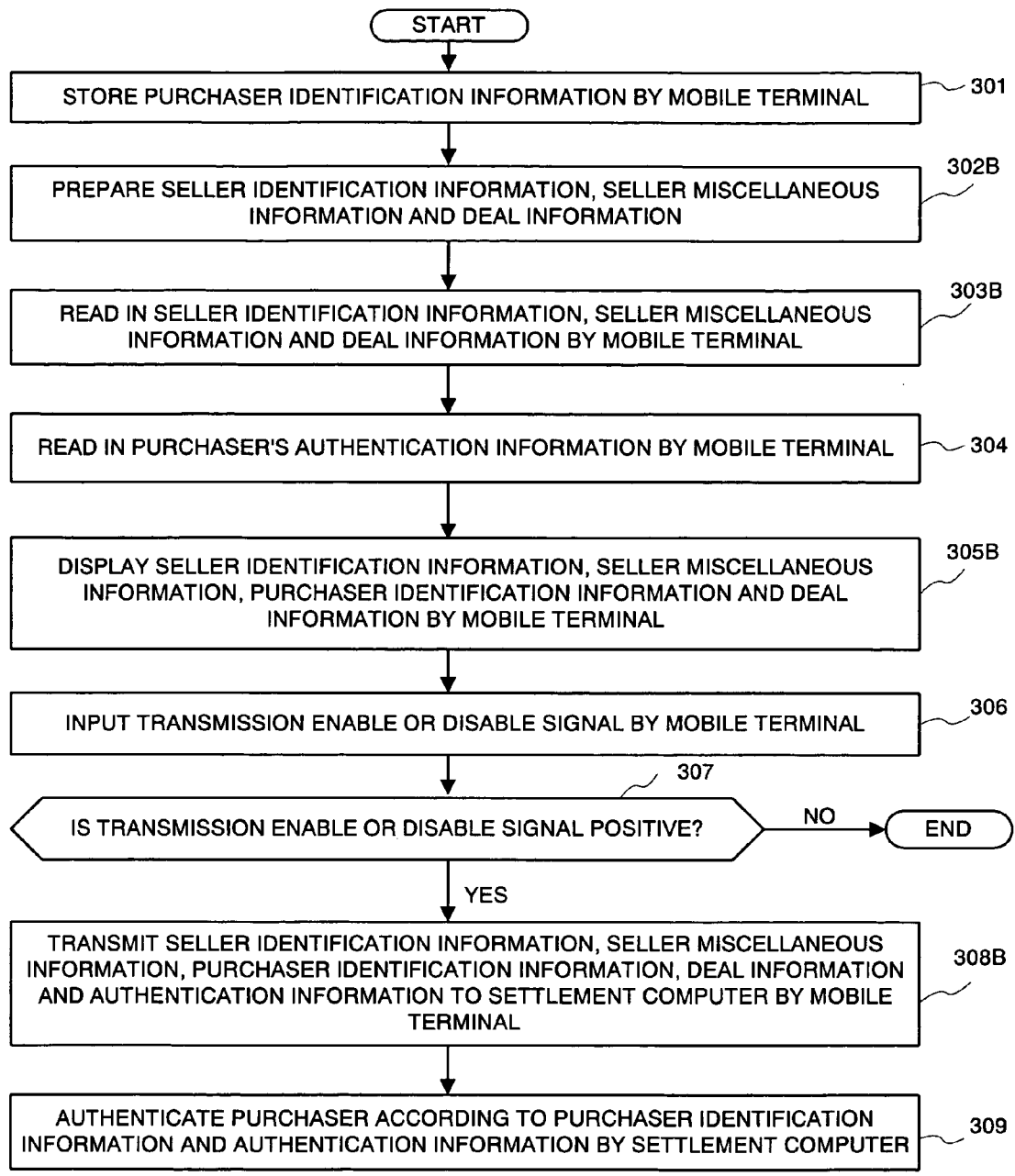
FIG. 5 is a third flowchart showing operation of the settlement method in a deal of a goods or a service according to the embodiment of the present invention.

Next, a second embodiment in which the mobile terminal 101 displays the seller miscellaneous information on the screen 115 prior to inputting the transmission enable or disable signal will be described with reference to FIG. 5.

The seller prepares not only the seller identification information and the deal information (step 302), but also the seller miscellaneous information in the form that the mobile terminal 101 can read in by the sensor 113 (step 302B). The mobile terminal 101 reads in not only the seller identification information and the deal information (step 303), but also the seller miscellaneous information (step 303B).

Furthermore, after the mobile terminal 101 read in the authentication information (step 304), the mobile terminal 101 displays not only the seller identification information, the purchaser identification information and the deal information (step 305), but also the purchaser miscellaneous information (step 305B).

Furthermore, if the transmission enable or disable signal is positive, the mobile terminal 101 transmits not only the seller identification information, the purchaser identification information, the deal information and the authentication information to the settlement computer 201 (step 308), but also the seller miscellaneous information to the settlement computer 201 (step 308B). Incidentally, if the seller miscellaneous information is also stored in the seller database 203, it is unnecessary that step 308 is replaced with step 308B.

At step 308B and on, the same operation in the operations from step 309 of FIG. 3 is performed.

Figure 6:
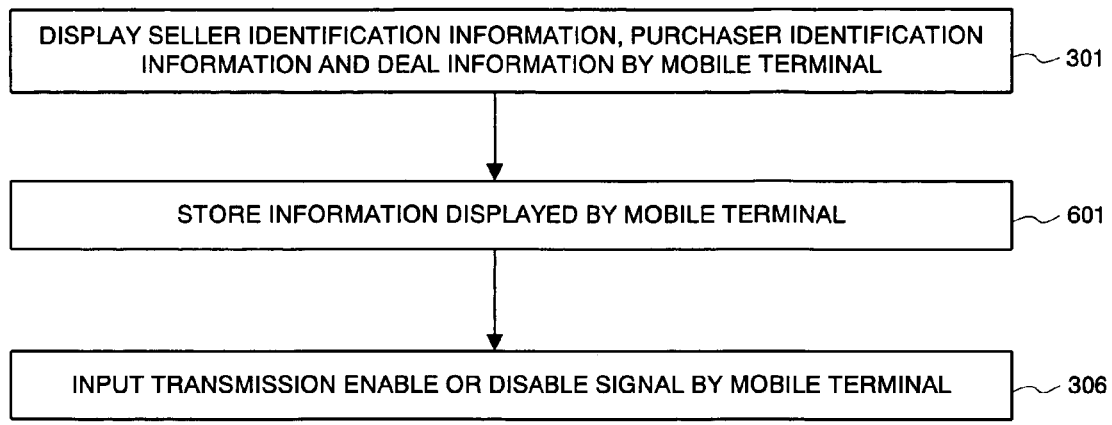
FIG. 6 is a fourth flowchart showing operation of the settlement method in a deal of a goods or a service according to the embodiment of the present invention.
Figure 7:
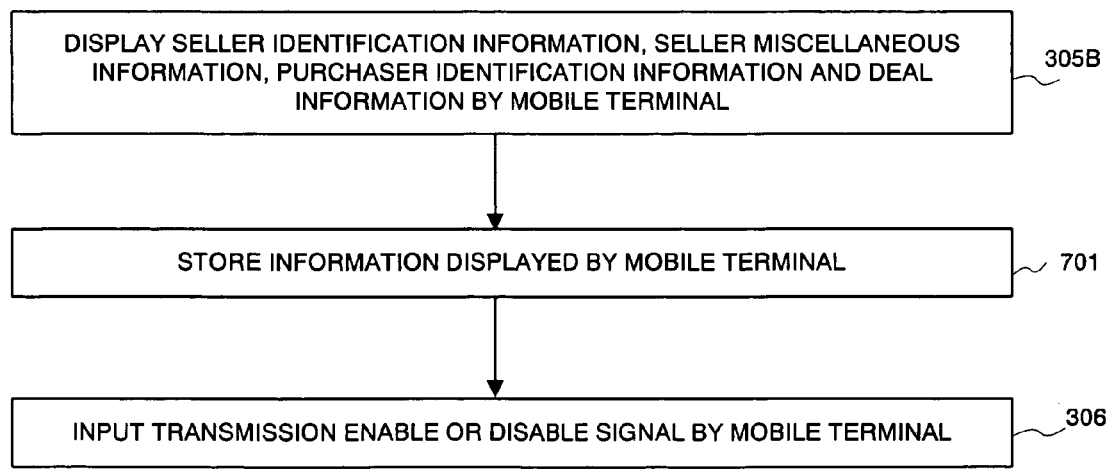
FIG. 7 is a fifth flowchart showing operation of the settlement method in a deal of a goods or a service according to the embodiment of the present invention.

Furthermore, as shown in FIGS. 6 and 7, before the mobile terminal 101 inputs the transmission enable or disable signal (step 306), the mobile terminal 101 may store the displayed information in the nonvolatile memory 112 (steps 601, 701). Furthermore, when the transmission enable or disable signal is affirmative, prior to transmission of the deal information, etc., the mobile terminal 101 may store the displayed information in the nonvolatile memory 112.

Next, the more concrete embodiment will be described.

The goods's seller directly or indirectly affixes a one-dimensional or two-dimensional bar code, a tag storing an electronic code, a tag storing a magnetic code, and the like to the goods before the purchaser purchases. A seller code as the seller identification information, a goods identification information as the deal information, a title, and a code indicating a price are recorded in the bar code, the tag, or the like affixed to the goods.

When the purchaser fetches a plurality of commodities to purchase to a cash register, after the commodities' seller calculates the total sum of the commodities, the seller may create the seller identification information and the deal information. In this case, the seller identification information includes a seller code, and the deal information includes identification information of the deal and the total sum of the commodities.

The seller identification information and the deal information are created in an optical form, an electric form, a magnetic form and a radiowave form which can be read in by a sensor. This creation form is same as when the seller of services in an eating house, etc. creates the seller identification information and the deal information.

Incidentally, the seller miscellaneous information such as a title, an address, a telephone number, or the like of the seller is annexed to the seller identification information, and creation may be made in the form readable by the sensor.

The purchaser reads in the seller identification information, the deal information and the seller miscellaneous information prepared by the seller as described above by the sensor 113 provided in the mobile telephone 101. When the seller identification information, the deal information and the seller miscellaneous information are in the form of the one-dimensional or two-dimensional bar code, the sensor 113 is a bar code reader, and when they are electric information, the sensor 113 is an electronic circuit provided with an electric terminal, and when they are magnetic information, the sensor 113 is a magnetic sensor, and when they are radiowave information, the sensor 113 is a receiver.

Next, the purchaser inputs the authentication information from the authentication information read-in device 114 provided in the mobile telephone 101. The authentication information is, for example, a password number, a voice, fingerprint information, eyeball information, or the like. When the authentication information is the password number, the authentication information read-in device 114 is same with the operation button 111, and when the authentication information is a voice, it is same with a mike, and when the authentication information is fingerprint information, and it is same with a fingerprint read-in device, and when the authentication information is eyeball information, it is same with an image sensor. When being the image sensor, it is possible to have the bar code reader in common.

Next, the mobile terminal 101 transmits the seller identification information, the purchaser identification information, the deal information, and the authentication information and the seller miscellaneous information to the settlement computer 201. A user or a settlement institution as a use consignor of the settlement computer 201 is a bank, a credit company, or the like.

The settlement computer 201 comprises the purchaser database 202 which has previously recorded the purchaser identification information and the purchaser miscellaneous information so as to correspond to each other. The purchaser miscellaneous information is a name, an address, a telephone number, a sex, an age, and the like of the purchaser. Furthermore, the settlement computer 201 comprises the seller database 203 which has previously recorded the seller identification information and the seller miscellaneous information so as to correspond to each other. The seller miscellaneous information is a name, an address, a telephone number, and the like of the seller.

Next, the settlement computer 201 refers to the purchaser database 202 and authenticates the purchaser based on the received purchaser identification information and authentication information.

If the purchaser authentication is successful, the settlement computer 201 settles by utilizing the seller identification information, the purchaser identification information and the deal information. The content of the settlement is a transfer from the purchaser's account 204 indicated by the purchaser identification information to the seller's account 205 indicated by the seller identification information. At this time, items excluding the sum indicated by the deal information (a title of a goods, identification information of the deal, or the like) may be affixed to transfer information.

If the settlement is completed, the settlement computer 201 transmits the settlement completion information to both or one of the seller's apparatus indicated by the seller identification information and the mobile terminal 101. The deal information, the purchaser identification information and the purchaser miscellaneous information may be affixed to the settlement completion information transmitted to the seller's apparatus. The deal information, the seller identification information and the seller miscellaneous information may be affixed to the settlement completion information transmitted to the mobile terminal 101.

The seller's apparatus is, for example, a computer, a register, a tag manager, a gate switch, or the like.

If the seller's apparatus receives the settlement completion information, etc., it makes a predetermined operation. When the seller's apparatus is a computer or a register, the contents of the predetermined operation are that the settlement completion information, etc. is displayed on a screen, printed, and stored in a storage device, and when the seller's apparatus is a tag manager, the content thereof is that a burglarproof flag relating to goods identification information indicated by the deal information is reset, and when the seller's apparatus is a gate switch, the content thereof is that a gate is opened. The seller's apparatus makes the predetermined operations, so that it can be prevented that a spurious person spuriously obtains any commodities or services directly or via the seller.

Furthermore, in order to make sure operation of the seller's device, the seller's apparatus may collate information input not via the settlement computer 201 by the purchaser or seller with information received from the settlement computer 201.

If the mobile terminal 101 receives the settlement completion information, etc., the mobile terminal 101 displays the settlement completion information, etc. on the screen 115, or stores it in the nonvolatile memory 112. The deal information, the seller identification information, the seller miscellaneous information, and the like stored in the nonvolatile memory 112 can be accumulated in a plurality of deals, and these can laser be confirmed or gathered by the purchaser.

Incidentally, in the aforesaid description, if the mobile terminal 101 reads in the seller identification information, the deal information, and the like, the mobile terminal 101 transmits unconditionally the seller identification information, the purchaser identification information, the deal information, the authentication information, or the like to the settlement computer 201, but if so, there is a fear that the purchaser transmits the seller information, the deal information, or the like reluctantly for the purchaser to be settled. Then, prior to transmission, the mobile terminal 101 displays the seller identification information, the seller miscellaneous information, and the deal information, and the purchaser operates the operation button 111 for inputting to the mobile terminal 101 whether or not these pieces of information may be transmitted, and only when the operation indicates that the purchaser intends to transmit the information, the mobile terminal 101 may transmit the seller identification information, the purchaser identification information, the deal information, the authentication information, or the like to the settlement computer 201.

The method for displaying the seller miscellaneous information before the mobile terminal 101 transmits the seller identification information, the purchaser identification information, the deal information, the authentication information, or the like will be explained, and when the seller presents the seller identification information, the purchaser identification information as well as the seller miscellaneous information, the sensor 113 of the mobile terminal 101 has only to read the seller identification information, the purchaser identification information as well as the seller miscellaneous information, to display the seller identification information, the purchaser identification information as well as the seller miscellaneous information.

When the seller does not present the seller identification information, the purchaser identification information as well as the seller miscellaneous information, proceed to the following: Namely, before the mobile terminal 101 displays the seller identification information, the purchaser identification information as well as the seller miscellaneous information, the mobile terminal 101 transmits to the settlement computer 201 an inquiry of the seller miscellaneous information accompanying the seller identification information. If the settlement computer 201 receives this inquiry, the settlement computer 201 retrieves the seller miscellaneous information in correspondence with the seller identification information accompanying the inquiry from the seller database 203, and transmits to the mobile terminal 101. The mobile terminal displays the received seller miscellaneous information together with the seller identification information and the purchaser identification information.

Next, embodiments of the present invention will be explained.

[Box Shop]

In a box shop, an electronic tag into which a code is written is affixed to a box of each goods. When a managing computer of a cash register resets a security flag in a code of a certain electronic tag, even if a goods affixing the electronic tag is passed through a gate, a warning buzzer does not ring, but if the goods affixing the electronic tag having a code in which the security flag is reset is passed through the gate, the warning buzzer rings. Therefore, it is possible to contrive a burglarproof effect.

The purchaser identification information such as a telephone number of a mobile terminal, an electronic mail address of an owner of the mobile terminal, or the like is in advance stored in the mobile terminal by the owner of the mobile terminal.

The seller affixes the electronic tags into which codes of identification information of commodities, solid identification information of commodities, and the like are written and bar codes in correspondence with the codes to respective commodities placed in the box shop. The seller identification information, the seller miscellaneous information and the deal information are recorded in the bar code. A title of the seller, an address of the seller and a telephone number of the seller are included in the seller miscellaneous information, and the identification information of commodities, the solid identification information of commodities, a title of a goods and a price of a goods are included in the deal information.

The purchaser lets the mobile terminal read the bar code affixed to the goods which the purchaser desires to purchase by a bar code reader provided therein in the box shop. Next, the purchaser lets the mobile terminal read the authentication information. Next, the mobile terminal displays the title of a goods, the price of a goods, a title of the seller, the purchaser identification information, and the like on a screen. If the purchaser read them and determined to purchase it, the purchaser operates a key on the mobile terminal for purchasing it. Next, the mobile terminal transmits the seller identification information, the purchaser identification information, the deal information, the authentication information, and the like to the settlement computer.

When the settlement computer authenticates and settles as described in the embodiment, the settlement computer transmits the settlement completion information, the deal information, the purchaser identification information, the purchaser miscellaneous information, and the like to the managing computer of the box shop. When the managing computer receives the settlement completion information, the deal information, the purchaser identification information, the purchaser miscellaneous information, and the like, the managing computer resets the security flag in the goods solid identification information included in the deal information. Furthermore, the managing computer records the selling contents in a database in accordance with the settlement completion information, the deal information, the purchaser identification information, the purchaser miscellaneous information, and the like.

Furthermore, when the settlement computer authenticates and settles, the settlement computer transmits to the mobile terminal the settlement completion information, the deal information, the purchaser identification information, the purchaser miscellaneous information, and the like. When the mobile terminal receives the settlement completion information, the deal information, the seller identification information, the seller miscellaneous information, and the like, the mobile terminal displays them on the screen. Accordingly, the purchaser can be aware that the settlement is completed in the goods that the purchaser desires to purchase. Furthermore, the mobile terminal may store the deal information, the seller identification information, the seller miscellaneous information, and the like.

Next, the purchase has goods affixing the electronic tag and passes the gate, and as the security flag is reset in the codes of the electronic tag, the warning buzzer does not ring.

In this manner, even if there is not a clerk at a cash register, it becomes possible to sell the commodities in the box shop. Furthermore, it is not necessary that the purchaser arranges in a line of the cash register.

[Food and Drink Vending Machine (1)]

The purchaser identification information such as a telephone number of the mobile terminal, an electronic mail address of an owner of the mobile terminal, and the like is in advance stored in the mobile terminal by an owner of the mobile terminal.

Bar codes encoding the seller identification information, the seller miscellaneous information, and the deal information are affixed to the vicinity of each sample window of the food and drink vending machine. The identification information of the seller and the identification information of the vending machine are included in the seller identification information. The title of the seller, the telephone number of the seller are included in the seller miscellaneous information. The identification information of each food and drink, the title of each food and drink and the price of each food and drink are included in the deal information.

The purchaser intending to purchase a certain type of food and drink which are sold by the food and drink vending machine lets the bar code reader attached to the mobile terminal read in the bar codes affixed to the vicinity of the sample window of the food and drink. Next, the mobile terminal displays the title of food and drink, the price of food and drink, the title of the seller, the purchaser identification information, and the like on the screen. If the purchaser read it and determined to purchase it, the purchaser operates a key in the mobile terminal for purchasing it. Next, the mobile terminal transmits to the settlement computer the seller identification information, the seller miscellaneous information, the purchaser identification information, the deal information, the authentication information, and the like.

When the settlement computer authenticates and settles as described in the embodiment, the settlement computer transmits the settlement completion information, the deal information, and the like to the food and drink vending machine denoted by vending machine identification information in the seller identification information. When the food and drink vending machine receives the settlement completion information, the deal information, and the like, the food and drink vending machine puts out food and drink in correspondence with the identification information of the food and drink included in the deal information to a takeoff of the food and drink. Furthermore, the vending machine may record the selling contents in a record medium in accordance with the settlement completion information, the deal information, and the like.

Furthermore, when the settlement computer authenticates and settles, the settlement computer transmits to the mobile terminal the settlement completion information, the deal information, the seller information, the seller miscellaneous information, and the like. When the mobile terminal receives the settlement completion information, the deal information, the seller information, the seller miscellaneous information, and the like, the mobile terminal displays them on the screen. Accordingly, the purchaser can be aware that the settlement of the food and drink that the purchaser desires to buy has been completed. Furthermore, the mobile terminal may store the deal information, the seller information, the seller miscellaneous information, and the like.

[Food and Drink Vending Machine (2)]

The purchaser identification information such as a telephone number of the mobile terminal, an electronic mail address of an owner of the mobile terminal, and the like is in advance stored in the mobile terminal by an owner of the mobile terminal.

The food and drink vending machine comprises a button for selecting the common food and drink; additionally a button for starting a settlement in the mobile terminal; a button for inputting the quantity of purchase of the food and drink; a button for ending to select the food and drink for purchasing; and an output device for outputting the seller identification information, the seller miscellaneous information and the deal information in an optical form, an electric form, a magnetic form, or a radiowave form. The seller's identification information and the vending machine's identification information are included in the seller identification information. The title of the seller and the telephone number of the seller are included in the seller miscellaneous information. The identification information, the title, the unit price, the quantity of purchase, and the total sum are included in each of one or a plurality of foods and drinks selected.

When the purchaser intends to purchase only a desired quantity in each type from the one or plurality of types of food and drink which are sold by the food and drink vending machine, the purchaser depresses the button for starting a settlement in the mobile terminal. Next, the purchaser operates the button for purchasing only a desired quantity in each type from the one or plurality of types of food and drink. Next, the purchaser depresses the button for ending to select the food and drink for purchasing. Next, the vending machine generates instantly the seller information, the seller miscellaneous information, and the deal information based on the selection contents by the button operation, and outputs to the output device in the predetermined form. The purchaser reads in the seller information, the seller miscellaneous information, and the deal information to the mobile terminal by a sensor or a read-in device provided in the mobile terminal in correspondence with the predetermined form represented by each information. Next, the mobile terminal displays the title of each food and drink, the quantity of purchase of each food and drink, the unit price of each food and drink, the total sum, the title of the seller, the purchaser identification information, and the like on the screen. When the purchaser read it and determined to purchase it, the purchaser operates the key on the mobile terminal for purchasing. Next, the mobile terminal transmits to the settlement computer the seller identification information, the seller miscellaneous information, the purchaser identification information, the deal information, the authentication information, and the like.

When the settlement computer authenticates and settles as explained in the embodiment, the settlement computer transmits the settlement completion information, the deal information, and the like to the food and drink vending machine represented by the vending machine identification information in the seller identification information. When the food and drink vending machine receives the settlement completion information, the deal information, and the like, the food and drink vending machine puts out the food and drink of only a quantity of purchase in correspondence with each identification information of one or a plurality of foods and drinks included in the deal information to a food and drink takeoff. Furthermore, the vending machine may record the selling contents in the record medium in accordance with the settlement completion information, the deal information, and the like.

Furthermore, when the settlement computer authenticates and settles, the settlement computer transmits to the mobile terminal the settlement completion information, the deal information, the seller information, the seller miscellaneous information, and the like. When the mobile terminal receives the settlement completion information, the deal information, the seller information, the seller miscellaneous information, and the like, the mobile terminal displays them on the screen. Accordingly, the purchaser can be aware that the settlement of the food and drink that the purchaser desires to buy is completed. Furthermore, the mobile terminal may store the deal information, the seller information, the seller miscellaneous information, and the like.

[Supermarket (1)]

The purchaser identification information such as a telephone number of the mobile terminal, an electronic mail address of an owner of the mobile terminal, and the like is in advance stored in the mobile terminal by an owner of the mobile terminal.

The purchaser selects a desired goods and enters it in a basket in a store of a supermarket, and places the basket on a counter of a cash register. Next, the clerk reads in the bar code affixed to the goods in the register in each of the commodities entered in the basket. The bar code affixed to the goods contains information encoding the identification information, title and price of the goods. Furthermore, the bar code affixed to the goods may contain the seller identification information and the seller miscellaneous information.

Next, the clerk operates the button for calculating the total sum in the register. Next, after the register calculates the total sum, the register generates instantly the deal information denoting the identification information, title and price of each goods, and the purchase quantity and the total sum, the seller identification information and the seller miscellaneous information, and outputs them to the output device in a predetermined form. The seller identification information includes identification information of the register also. The deal information contains identification information of the deal also. Next, the purchaser reads in the deal information, the seller identification information and the seller miscellaneous information to the mobile terminal by the sensor or the read-in device of the mobile terminal in correspondence with the predetermined form. Next, the mobile terminal displays the title, unit price and purchase quantity of each goods, the total sum, the title of the seller, the purchaser identification information, and the like on the screen. If the purchaser reading them determined to purchase, the purchaser operates the key in the mobile terminal for purchasing. Next, the mobile terminal transmits the seller identification information, the seller miscellaneous information, the purchaser identification information, the deal information, the authentication information, and the like to the settlement computer.

When the settlement computer authenticates and settles as described in the embodiment, the settlement computer transmits the settlement completion information, the deal information, the purchaser identification information, the purchaser miscellaneous information, and the like to the register represented by the seller identification information. Next, the register displays the settlement completion information, the deal identification information, and the like on the screen. The clerk who saw the contents of this screen confirms that the settlement is completed, and conveys the effect to the purchaser.

Furthermore, the register or a centralized managing computer of the register records the selling contents in a database in accordance with the settlement completion information, the deal information, the purchaser identification information, the purchaser miscellaneous information, and the like.

Furthermore, when the settlement computer authenticates and settles, the settlement computer transmits the settlement completion information, the deal information, the seller information, the seller miscellaneous information, and the like to the mobile terminal. When the mobile terminal receives the settlement completion information, the deal information, the seller information, the seller miscellaneous information, and the like, the mobile terminal displays them on the screen. Accordingly, the purchaser can be aware that the settlement of the goods that the purchaser desires to buy is completed. Furthermore, the mobile terminal may store the deal information, the seller information, the seller miscellaneous information, and the like.

The purchaser was informed from the clerk or confirmed by the mobile terminal that the settlement is completed, and exits the supermarket.

[Supermarket (2)]

The purchaser identification information such as a telephone number of the mobile terminal, an electronic mail address of an owner of the mobile terminal, and the like is in advance stored in the mobile terminal by an owner of the mobile terminal.

The purchaser selects a desired goods and enters it in a basket in a store of the supermarket. Next, the purchaser reads in the bar code affixed to the goods in each of the commodities entered in the basket in the mobile terminal by the bar code reader attached to the mobile terminal at a corner for settling by the mobile terminal. Furthermore, the purchaser reads in the bar codes having the seller identification information and the seller miscellaneous information prepared at the corner in the mobile terminal by the bar code reader of the mobile terminal. The bar code affixed to the goods contains information encoding the identification information, title and unit price of the goods. The information encoding the identification information, title and unit price of the goods is basic information. Furthermore, the bar code affixed to the goods may contain the seller identification information and the seller miscellaneous information, but in this case, it is unnecessary that the purchaser reads in the bar code having the seller identification information and the seller miscellaneous information prepared at the corner in the mobile terminal by the bar code reader of the mobile terminal.

Next, the clerk operates the button for calculating the total sum in the mobile terminal. Next, after the mobile terminal calculates the total sum by calculation means provided therein or a received calculation program, the mobile terminal generates instantly the deal information denoting the identification information, title, price of each goods, the purchase quantity and the total sum. Next, the mobile terminal displays the title, unit price and purchase quantity of each goods, the total sum, the title of the seller, the purchaser identification information, and the like on the screen. If the purchaser reading them determined to purchase, the purchaser operates the key in the mobile terminal for purchasing. Next, the mobile terminal transmits the seller identification information, the seller miscellaneous information, the purchaser identification information, the deal information, the authentication information, and the like to the settlement computer.

When the settlement computer authenticates and settles as described in the embodiment, the settlement computer transmits the settlement completion information, the deal information, the purchaser identification information, the purchaser miscellaneous information, and the like to the seller's selling recording computer represented by the seller identification information. The selling recording computer records the selling contents in the database in accordance with the settlement completion information, the deal information, the purchaser identification information, the purchaser miscellaneous information, and the like.

Furthermore, when the settlement computer authenticates and settles, the settlement computer transmits the settlement completion information, the deal information, the seller information, the seller miscellaneous information, and the like to the mobile terminal. When the mobile terminal receives the settlement completion information, the deal information, the seller information, the seller miscellaneous information, and the like, the mobile terminal displays them on the screen. Accordingly, the purchaser can be aware that the settlement of the goods that the purchaser desires to buy is completed. Furthermore, the mobile terminal may store the deal information, the seller information, the seller miscellaneous information, and the like.

The purchaser confirmed that the settlement is completed, and exits from the supermarket.

In this method, there is a fear that there may be some persons who exit the supermarket without settling or by deceiving the settlement contents, but it is possible to oppress such doing by a surprise inspection, for example.

[The Tokyo Highway]

The purchaser identification information such as a telephone number of the mobile terminal, an electronic mail address of an owner of the mobile terminal, and the like is in advance stored in the mobile terminal by an owner of the mobile terminal.

Short of a tollhouse, an output device for outputting the seller identification information, the seller miscellaneous information and the deal information in the predetermined form is installed. The seller identification information is also included in the identification information of the tollhouse. Furthermore, the seller miscellaneous information contains a title of the Express Public Corporation and the deal information contains a toll, etc.

When an automobile comes to the output device provided short of the tollhouse of the Tokyo Highway, a driver or a passenger lets the mobile terminal read the seller identification information, the seller miscellaneous information and the deal information output from the output device in the predetermined form by a sensor or a read-in device provided in the mobile terminal in correspondence with the form or connected to the mobile terminal. When the seller identification information, the seller miscellaneous information and the deal information are represented by the bar codes, they are read in by a bar code reader by stopping or crawling the automobile, but when the information is represented in the radiowave form, it is possible to receive them by a receiver and read them in without stopping or crawling the automobile.

Next, the mobile terminal reads in the authentication information by the read-in device provided in the mobile terminal, or connected thereto. If the authentication information is a voice, the read-in device may be a mike of the mobile terminal. If the authentication information is fingerprint information, the read-in device may be a fingerprint read-in device provided in the mobile terminal, or a fingerprint read-in device provided in a wheel, etc.

Next, the mobile terminal displays the seller identification information, a title of the Highway public Corporation included in the seller miscellaneous information, a toll included in the deal information, and the like on the screen of the mobile terminal, or on the screen of the display device connected to the mobile terminal. If the driver who read them determined to penetrate into the tollhouse, the driver operates a button provided in the key of the mobile terminal, the wheel, or the like for the key operation for accepting the settlement. The driver may operate with utterance of a word to the effect of acceptance in place of the key operation. Next, the mobile terminal transmits to the settlement computer the seller identification information, the seller miscellaneous information, the purchaser identification information, the deal information, the authentication information, and the like. Incidentally, the procedure for accepting the settlement is omitted and an automatic acceptance is agreeable.

When the settlement computer authenticates and settles as described in the embodiment, the settlement computer transmits the settlement completion information, the deal information, the purchaser information, the purchaser miscellaneous information, and the like to the tollhouse's computer represented by the seller identification information. The settlement completion information contains also a settlement number generated by the settlement computer. When the computer of the tollhouse receives the settlement completion information, the deal information, the purchaser information, the purchaser miscellaneous information, and the like, the information is displayed on the screen.

Furthermore, when the settlement computer authenticates and settles, the settlement computer transmits the settlement completion information, the deal information, the seller information, the seller miscellaneous information, and the like to the mobile terminal. When the mobile terminal receives the settlement completion information, the deal information, the seller information, the seller miscellaneous information, and the like, the information is displayed on the screen. Accordingly, the driver, etc. can be aware that the settlement in passage of the tollhouse is completed. Furthermore, the mobile terminal stores the deal information, the seller information, the seller miscellaneous information, and the like.

If entering of the automobile is detected in the tollhouse, the settlement number received by the tollhouse's computer is collated with the settlement number possessed by the automobile's driver, etc., and when the collation failed, a collection of the toll, a number plate, the driver, and the like are photographed, etc.

An attendant may perform the aforesaid method in the tollhouse, or an apparatus may do. In case of the apparatus, entering of the automobile is detected by an object sensor, and the collation is carried out by way of short distance communication between the computer of the tollhouse and the mobile terminal, or communication via a base station.

[The Tomei Highway (1)]

The purchaser identification information such as a telephone number of the mobile terminal, an electronic mail address of an owner of the mobile terminal, and the like is in advance stored in the mobile terminal by an owner of the mobile terminal.

In the same manner as in the prior art, a card issuer is installed at an entrance gate.

When the driver, etc. enters the highway, the driver, etc. acquires a card recording identification information of the entrance gate at the entrance gate. Next, if the automobile reached the tollhouse of a destination, the driver, etc. delivers over the card to the attendant.

The attendant lets the computer calculate a toll from the entrance gate utilizing the identification information of the entrance gate recorded in the card to the tollhouse, and print the bar codes recording the seller identification information, the seller miscellaneous information and the deal information on a paper. The seller identification information contains tollhouse identification information. The seller miscellaneous information is a title of the Express Public Corporation, etc., and the deal information contains the toll, a title of a residence of the entrance gate, a title of a residence of the tollhouse, a distance between the residences, and the like. The attendant delivers over the paper printing the bar codes to the driver, etc. Next, the driver or passenger reads the bar codes in the mobile terminal by the bar code reader provided in the mobile terminal. Next, the driver or passenger reads in the authentication information by the read-in device provided in the mobile terminal.

Next, the mobile terminal displays the seller identification information, the title of the Express Public Corporation included in the seller miscellaneous information, the toll included in the deal information, and the like on the screen of the mobile terminal. If the driver who read them determined to accept the settlement, the driver operates a button provided in the mobile terminal for the key operation for accepting the settlement. The driver may operate with utterance of a word to the effect of acceptance in place of the key operation. Next, the mobile terminal transmits to the settlement computer the seller identification information, the seller miscellaneous information, the purchaser identification information, the deal information, the authentication information, and the like.

When the settlement computer authenticates and settles as described in the embodiment, the settlement computer transmits the settlement completion information, the deal information, the purchaser information, the purchaser miscellaneous information, and the like to the tollhouse's computer represented in the seller identification information. The settlement completion information contains also the settlement number generated by the settlement computer. When the computer of the tollhouse receives the settlement completion information, the deal information, the purchaser information, the purchaser miscellaneous information, and the like, the information is displayed on the screen.

Furthermore, when the settlement computer authenticates and settles, the settlement computer transmits the settlement completion information, the deal information, the seller information, the seller miscellaneous information, and the like to the mobile terminal. When the mobile terminal receives the settlement completion information, the deal information, the seller information, the seller miscellaneous information, and the like, the information is displayed on the screen. Accordingly, the driver, etc. can be aware that the settlement in passage of the tollhouse is completed. Furthermore, the mobile terminal stores the deal information, the seller information, the seller miscellaneous information, and the like.

If the attendant of the tollhouse confirmed that the settlement number included in information displayed in the screen of the computer of the tollhouse agrees with the settlement number that the driver, etc. reads from the screen of the mobile terminal and notifies to the attendant, the attendant notifies the driver, etc. of the effect that the settlement completion is confirmed, and the driver who received the notification exits the tollhouse. Alternatively, a number of the automobile is included in the purchaser miscellaneous information, and the computer of a settlement authority transmits the number to the computer of the tollhouse, and the computer of the tollhouse displays the number, and the attendant may collate the displayed number with the number affixed to the automobile.

[The Tomei Highway (2)]

The purchaser identification information such as a telephone number of the mobile terminal, an electronic mail address of an owner of the mobile terminal, and the like is in advance stored in the mobile terminal by an owner of the mobile terminal.

The output device for outputting, in a predetermined form, entrance gate identification information for identifying an entrance gate and entrance gate miscellaneous information denoting the title of the entrance gate, etc. is installed at the entrance gate. Incidentally, the entrance gate identification information may be referred to as the title of the entrance gate. The entrance gate identification information and the entrance gate miscellaneous information are basic information.

The output device for outputting, in the predetermined form, the seller identification information, the seller miscellaneous information and the basic information is installed short of the tollhouse. The tollhouse identification information for identifying the tollhouse is included in the basic information. Furthermore, the seller miscellaneous information is the title of the Express Public Corporation, the title of the tollhouse, and the like.

When the automobile comes to the output device of the entrance gate, the driver or passenger lets the mobile terminal read the entrance gate identification information and the entrance gate miscellaneous information output, in a predetermined form, from the output device by the sensor or the read-in device provided in the mobile terminal or connected to the mobile terminal in correspondence with the form. When the entrance gate identification information and the entrance gate miscellaneous information are represented by the bar code, they are read in by the bar code reader by stopping or crawling the automobile, but when the information is represented in the radiowave form, it is possible to receive them and read in them without stopping or crawling the automobile.

Next, the mobile terminal displays the entrance gate identification information and the entrance gate miscellaneous information on the screen of the mobile terminal or on the screen of the display device connected to the mobile terminal. Next, the mobile terminal transmits the entrance gate identification information, the entrance gate miscellaneous information and the purchaser identification information to a toll calculating computer (deal information generator).

When the automobile comes to the output device provided short of the tollhouse, the driver or passenger lets the mobile terminal read the seller identification information, the seller miscellaneous information and the basic information output, in the predetermined form, from the output device by the sensor or the read-in device provided in the mobile terminal or connected to the mobile terminal in correspondence with the form. When the seller identification information, the seller miscellaneous information and the basic information are represented by the bar codes, the automobile is stopped or crawled to read them in by the bar code reader, but when the information is represented in the radiowave form, it is possible to receive them by the receiver and read them in without stopping or crawling the automobile.

Next, the mobile terminal displays the seller identification information, the seller miscellaneous information and the basic information on the screen of the mobile terminal, or on the screen of the display device connected to the mobile terminal. Next, the mobile terminal transmits the seller identification information, the seller miscellaneous information, the purchaser identification information and the basic information to the toll calculating computer.

Next, the toll calculating computer utilizes the entrance gate identification and the purchaser identification information received when the automobile passes the output device of the entrance gate; and the tollhouse identification information and the purchaser identification information received when the automobile passes the output device short of the tollhouse, to calculate the toll, and transmits back to the mobile terminal the deal information indicating the toll, the title of the entrance gate and the title of the tollhouse, the seller identification information and the seller miscellaneous information.

Next, the mobile terminal reads in the authentication information by the read-in device provided in the mobile terminal, or connected to the mobile terminal. If the authentication information is a voice, the read-in device may be a mike of the mobile terminal. If the authentication information is fingerprint information, it may be a fingerprint read-in device provided in the mobile terminal, or may be the fingerprint read-in device provided in the wheel, etc.

Next, the mobile terminal displays the seller identification information, the title of the Express Public Corporation included in the seller miscellaneous information, the toll included in the deal information, the title of the entrance gate, the title of the toll, and the like on the screen of the mobile terminal, or on the screen of the display device connected to the mobile terminal. If the driver who read them determined to enter the tollhouse, the driver operates a button provided in the key of the mobile terminal, or the wheel, etc. for the key operation for accepting the settlement. The driver may operate with utterance of a word to the effect of acceptance in place of the key operation. Next, the mobile terminal transmits to the settlement computer the seller identification information, the seller miscellaneous information, the purchaser identification information, the deal information, the authentication information, and the like. Incidentally, the procedure for accepting the settlement is omitted, and the automatic acceptance is agreeable.

When the settlement computer authenticates and settles as described in the embodiment, the settlement computer transmits the settlement completion information, the deal information, the purchaser information, the purchaser miscellaneous information, and the like to the tollhouse's computer represented in the seller identification information. The settlement completion information contains also the settlement number generated by the settlement computer. When the computer of the tollhouse receives the settlement completion information, the deal information, the purchaser information, the purchaser miscellaneous information, and the like, the information is displayed on the screen.

Furthermore, when the settlement computer authenticates and settles, the settlement computer transmits the settlement completion information, the deal information, the seller information, the seller miscellaneous information, and the like to the mobile terminal. When the mobile terminal receives the settlement completion information, the deal information, the seller information, the seller miscellaneous information, and the like, the information is displayed on the screen. Accordingly, the driver, etc. can be aware that the settlement in passage of the tollhouse is completed. Furthermore, the mobile terminal stores the deal information, the seller information, the seller miscellaneous information, and the like.

If entering of the automobile is detected in the tollhouse, the settlement number received by the tollhouse's computer is collated with the settlement number possessed by the automobile's driver, etc., and when the collation is failed, the collection of the toll, the number plate, the driver, and the like are photographed, etc.

The attendant may perform the aforesaid method in the tollhouse, or the apparatus may do. In case of the apparatus, the entering of the automobile is detected by an object sensor, and the collation is carried out by way of short distance communication between the computer of the tollhouse and the mobile terminal, or communication via a base station.

As explained above, the below effect will be exercised according to the present invention.

Even if the mobile terminal is lost or stolen, as the purchaser information is collated with the authentication information when settling, it is possible to prevent that a third party spuriously uses the mobile terminal. Accordingly, this settlement is higher in security than a cash settlement or a card settlement.

Furthermore, as the seller information, the seller miscellaneous information and the deal information can be accumulated in the mobile terminal, the purchaser can confirm or gather the own purchase record by only utilizing the mobile terminal.

Furthermore, as the purchaser per se settles by the mobile terminal, it is unnecessary that a person who settles is posted in the actual business site.

Furthermore, as the purchaser can collate the contents of the goods or service presented actually with the contents of the goods or service shown by the deal information, there is no danger accompanied by a virtual deal without actuals confirmation.

The entire disclosure of Japanese Patent No.2000-136217 filed on May 9, 2000 including specification, claims, drawing and summary are incorporated herein by reference in its entirety.

What is claimed is:

1. A settlement method in a deal of a goods or a service, comprising the steps of:
   storing purchaser identification information for identifying a purchaser by a mobile terminal;
   preparing deal information in said deal of said goods or said service in which a seller sells and said purchaser purchases, and seller identification information for identifying said seller;
   reading in said deal information and said seller identification information by said mobile terminal;
   reading in authentication information of said purchaser by said mobile terminal;
   transmitting said seller identification information, said purchaser identification information, said deal information and said authentication information to a settlement computer by said mobile terminal;
   authenticating said purchaser based on said purchaser identification information and said authentication information by said settlement computer; and
   when succeeding in authenticating said purchaser, settling by said settlement computer's utilizing said seller identification information, said purchaser identification information and said deal information,
   wherein said deal information and said seller identification information are indicated by a one-dimensional or two-dimensional bar code that is scanned by said mobile terminal, said bar code being provided on the goods or being provided directly to a user of the mobile terminal by the seller for purchase of the service, and
   wherein the seller and the purchaser are co-located during the deal.

2. The settlement method in a deal of a goods or a service according to claim 1, prior to said step of transmitting said seller identification information, said purchaser identification information, said deal information and said authentication information to said settlement computer by said mobile terminal, further comprising the steps of:
   displaying said deal information by said mobile terminal; and
   inputting a transmission enable or disable signal by said mobile terminal, wherein
   only when said transmission enable or disable signal is positive, said mobile terminal transmits said seller identification information, said purchaser identification information, said deal information and said authentication information to said settlement computer.

3. The settlement method in a deal of a goods or a service according to claim 2, wherein at said step of displaying said deal information by said mobile terminal, said mobile terminal displays also said seller identification information.

4. The settlement method in a deal of a goods or a service according to claim 2, further comprising the steps of:
   in advance storing said seller identification information and seller miscellaneous information so as to correspond to each other by said settlement computer;
   transmitting said read-in seller identification information to said settlement computer by said mobile terminal; and
   transmitting said seller miscellaneous information corresponding to said transmitted seller identification information to said mobile terminal by said settlement computer, wherein
   at said step of displaying said deal information by said mobile terminal, said mobile terminal displays also said seller miscellaneous information.

5. The settlement method in a deal of a goods or a service according to claim 4, wherein said seller miscellaneous information is at least one of a name, an address and a telephone number of said seller.

6. The settlement method in a deal of a goods or a service according to claim 2, further comprising said steps of:
   at said step of preparing said deal information and said seller identification information, preparing seller miscellaneous information;
   at said step of reading in said deal information and said seller identification information by said mobile terminal, reading in also said seller miscellaneous information by said mobile terminal; and
   at said step of displaying said deal information by said mobile terminal, displaying also said seller miscellaneous information by said mobile terminal.

7. The settlement method in a deal of a goods or a service according to claim 6, wherein said seller miscellaneous information is indicated by an optical form, an electric form, a magnetic form or a radiowave form.

8. The settlement method in a deal of a goods or a service according to claim 2, further comprising the step of storing said information displayed by said mobile terminal.

9. The settlement method in a deal of a goods or a service according to claim 6, wherein said seller miscellaneous information is indicated by a one-dimensional or two-dimensional bar code.

10. The settlement method in a deal of a goods or a service according to claim 1, further comprising the steps of:
at said step of preparing said deal information and said seller identification information, preparing basic information instead of said deal information;
at said step of reading in said deal information and said seller identification information by said mobile terminal, reading in said basic information instead of said deal information; and
generating said deal information based on said basic information by said mobile terminal.

11. The settlement method in a deal of a goods or a service according to claim 1, further comprising the steps of:
at said step of preparing said deal information and said seller identification information, preparing basic information instead of said deal information;
at said step of reading in said deal information and said seller identification information by said mobile terminal, reading in said basic information instead of said deal information;
transmitting said basic information to a deal information generator by said mobile terminal; and
receiving said deal information generated based on said basic information by said deal information generator, by said mobile terminal.

12. The settlement method in a deal of a goods or a service according to claim 1, further comprising the step of: after said settlement computer completes settling, transmitting settlement completion information to said seller's apparatus indicated by said seller identification information, by said settlement computer.

13. The settlement method in a deal of a goods or a service according to claim 12, further comprising the step of: when said settlement computer transmits said settlement completion information to said seller's apparatus, transmitting said deal information to said seller's apparatus.

14. The settlement method in a deal of a goods or a service according to claim 13, wherein said seller's apparatus makes a predetermined operation based on said received settlement completion information and deal information.

15. The settlement method in a deal of a goods or a service according to claim 12, further comprising the step of: when said settlement computer transmits said settlement completion information to said seller's apparatus, transmitting said purchaser identification information to said seller's apparatus.

16. The settlement method in a deal of a goods or a service according to claim 12, further comprising the steps of:
in advance storing said purchaser identification information and said purchaser miscellaneous information so as to correspond to each other by said settlement information; and
when said settlement computer transmits said settlement completion information to said seller's apparatus, transmitting said purchaser miscellaneous information to said seller's apparatus.

17. The settlement method in a deal of a goods or a service according to claim 12, further comprising the step of displaying or printing said received information by said seller's apparatus.

18. The settlement method in a deal of a goods or a service according to claim 12, further comprising the step of storing said received information by said seller's apparatus.

19. The settlement method in a deal of a goods or a service according to claim 1, further comprising the step of: after said settlement computer completes settling, transmitting said settlement completion information to said mobile terminal and to said seller's apparatus by said settlement computer,
wherein, when said settlement completion information indicates that the deal has been completed between said seller and said purchaser, said method further comprising:
signaling a gate device, by said seller's apparatus, to allow passage of the goods or the service corresponding to the deal therethrough without causing a visual or audible warning.

20. The settlement method in a deal of a goods or a service according to claim 19, further comprising the step of: after said settlement computer transmits said settlement completion information to said mobile terminal, transmitting said deal information to said mobile terminal.

21. The settlement method in a deal of a goods or a service according to claim 19, further comprising said step of: after said settlement computer transmits said settlement completion information to said mobile terminal, transmitting said seller identification information.

22. The settlement method in a deal of a goods or a service according to claim 19, further comprising the steps of:
in advance storing said seller identification information and said seller miscellaneous information so as to correspond to each other by said settlement computer; and
when said settlement computer transmits said settlement completion information to said mobile terminal, transmitting said purchaser identification information, said deal information and said authentication information as well as said seller miscellaneous information corresponding to said transmitted seller identification information.

23. The settlement method in a deal of a goods or a service according to claim 19, further comprising the steps of:
at said step of preparing said deal information and said seller identification information, preparing seller miscellaneous information;
at said step of reading in said deal information and said seller identification information by said mobile terminal, reading in also said seller miscellaneous information by said mobile terminal;
at said step of transmitting said seller identification information, said purchaser identification information, said deal information, and said authentication information to said settlement computer by said mobile terminal, transmitting also said seller miscellaneous information by said mobile terminal; and
when said settlement computer transmits said settlement completion information to said mobile terminal, transmitting also said seller miscellaneous information.

24. The settlement method in a deal of a goods or a service according to claim 19, further comprising said step of:
displaying said information received by said mobile terminal.

25. The settlement method in a deal of a goods or a service according to claim 19, further comprising said step of: storing said information received by said mobile terminal.

26. The settlement method in a deal of a goods or a service according to claim 1, wherein said purchaser identification information includes a telephone number or an e-mail address.

27. The settlement method in a deal of a goods or a service according to claim 1, wherein said deal information indicates at least the sum of said goods or said service.

28. The settlement method in a deal of a goods or a service according to claim 27, wherein said deal information indicates also identification information of said deal.

29. The settlement method in a deal of a goods or a service according to claim 27, wherein said deal information indicates also a title of said goods or service.

30. The settlement method in a deal of a goods or a service according to claim 27, wherein said deal information indicates also identification information of said goods or service.

31. The settlement method in a deal of a goods or a service according to claim 1, wherein said deal information and said seller identification information are indicated by an optical form, an electric form, a magnetic form or a radiowave form.

32. The settlement method in a deal of a goods or a service according to claim 1, wherein said authentication information is a password, a voice, fingerprint information, or eyeball information.

33. The settlement method in a deal of a goods or a service according to claim 1, wherein said purchaser miscellaneous information is at least one of a name, an address, a telephone number, an age and a sex distinction of said purchaser.

34. A mobile terminal, comprising:
means for storing purchaser identification information for identifying a purchaser;
means for reading in deal information in deal of goods or service which a seller sells and said purchaser purchases, and seller identification information for identifying said seller, said deal information and said seller identification information being indicated by a one-dimensional or two-dimensional bar code that is scanned by said mobile terminal or is provided directly to a user of said mobile terminal by said seller for purchase of the service;
means for reading in authentication information of said purchaser; and
means for transmitting said seller identification information, said purchaser identification information, said deal information and said authentication information to the settlement computer,
wherein said seller and said purchaser are co-located during the deal.

35. The mobile terminal according to claim 34, further comprising means for receiving said settlement completion information from said settlement computer.

36. A settlement computer, comprising:
means for receiving seller identification information for identifying a seller, purchaser identification information for identifying a purchaser, deal information in a deal of goods or service which said seller sells and said purchaser purchases, and authentication information of said purchaser, from a mobile terminal, said deal information and said seller identification information being indicated by a one-dimensional or two-dimensional bar code that is scanned by said mobile terminal or is provided directly to a user of said mobile terminal by said seller for purchase of the service;
means for authenticating said purchaser by said purchaser identification information and said authentication information; and
means for, when succeeding in authenticating said purchaser, settling by utilizing said seller identification information, said purchaser identification information and said deal information,
wherein said seller and said purchaser are co-located during the deal.

37. The settlement computer according to claim 36, further comprising first transmission means for, after said settlement is completed, transmitting said settlement completion information to said seller's apparatus indicated by said seller information.

38. The settlement computer according to claim 37, wherein said first transmission means transmits said deal information also to said seller's apparatus.

39. The settlement computer according to claim 37, wherein said first transmission means transmits said purchaser identification information also to said apparatus.

40. The settlement computer according to claim 37, further comprising means for in advance storing said purchaser identification information and said purchaser miscellaneous information so as to correspond to each other, wherein
said first transmission means transmits said purchaser miscellaneous information also corresponding to said purchaser identification information to said seller's apparatus.

41. The settlement computer according to claim 36, further comprising second transmission means for, after said settlement is completed, transmitting said settlement completion information to said mobile terminal.

42. The settlement computer according to claim 41, wherein said second transmission means transmits said deal information also to said mobile terminal.

43. The settlement computer according to claim 41, wherein said second transmission means transmits said seller identification information also to said mobile terminal.

44. The settlement computer according to any one of claim 41, further comprising means for in advance storing said seller identification information and said seller miscellaneous information so as to correspond to each other, wherein
said second transmission means transmits said seller miscellaneous information also corresponding to said seller identification information to said mobile terminal.

* * * * *